A. R. HOFFMANN.
FEEDING APPARATUS.
APPLICATION FILED SEPT. 1, 1911.
1,042,115.
Patented Oct. 22, 1912.
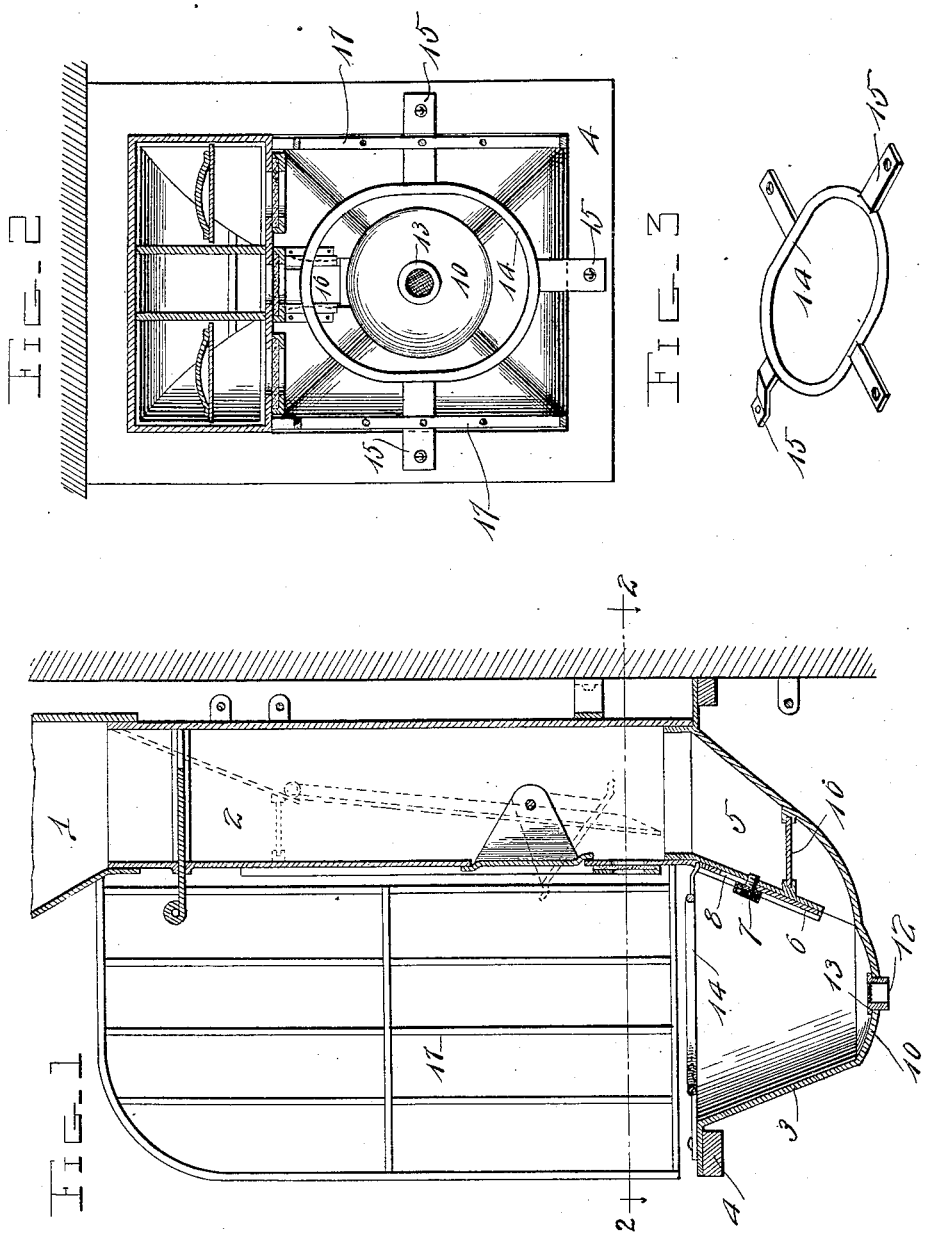
Inventor
A. R. Hoffmann.

UNITED STATES PATENT OFFICE.

AUGUST R. HOFFMANN, OF ST. LOUIS, MISSOURI.

FEEDING APPARATUS.

1,042,115.  Specification of Letters Patent.  Patented Oct. 22, 1912.

Original application filed May 25, 1911, Serial No. 629,475. Divided and this application filed September 1, 1911. Serial No. 647,246.

*To all whom it may concern:*

Be it known that I, AUGUST R. HOFFMANN, a citizen of the United States, residing in the city of St. Louis, State of Missouri, have invented certain new and useful Improvements in Feeding Apparatus; and I do declare the following to be a full, clear, and exact description of the invention, such as will enable others skilled in the art to which it appertains to make and use the same.

This invention relates to improvements in feeding apparatus for supplying grain, mill feed, chop and the like to stock.

The object of the invention is to provide a simple and efficient means adapted to be applied to the feed trough of the apparatus to limit the lateral movement of the animal's head while eating, thus preventing the feed from being thrown or scattered from the trough and yet permits the free circulation of air through the trough. This device is designed to be used in connection with the feeding apparatus shown in my pending application Serial No. 629,475, filed May 25, 1911, and in my companion application filed on even date, Serial No. 647,245, this being a division of application No. 629,475.

With this and other objects in view, the invention consists of certain novel features of construction, and the combination and arrangement of parts as will be more fully described and claimed.

In the accompanying drawings: Figure 1 is a vertical sectional view through a feeding apparatus showing the application of the invention thereto; Fig. 2 is a horizontal sectional view on the line 2—2 of Fig. 1; Fig. 3 is a detail perspective view of the invention removed from the apparatus.

Referring more particularly to the drawings, 1 denotes a bin or hopper adapted to contain feed and which may be supplied from any suitable source. Connected with the lower or discharge end of the bin or hopper is a vertically disposed feed chute 2, the lower end of which is arranged to discharge into a feed box or trough 3 suitably supported by the manger frame 4 as shown. A downwardly and forwardly inclined passage 5 connects the lower end of the chute 2 with the bottom of the box 3, said passage having its discharge end provided with a vertically slidable closure 6 having a suitable means for holding the same in adjusted position, said means being here shown and is preferably in the form of a set screw 7 secured to the front wall of the passage 5 and having an operative engagement in a longitudinally disposed slot 8 formed in the closure 6. The front wall of the passage 5 also constitutes the rear wall of the feed box 3.

The feed box 3 is preferably constructed of metal and has its side walls inclined inwardly and merging at their lower ends into a concaved or rounded bottom 10. The boxes are of any desired or suitable depth to permit the animal feeding therefrom to easily reach the bottom thereof and which, at the same time are of sufficient depth to prevent the food from being thrown out of the same by the animal while feeding. The bottom 10 of the box is provided with a centrally disposed aperture in which is removably engaged a hollow tubular plug 12, the upper or inner end of which is covered by a screen of wire netting or other foraminous material. The tubular plug is provided on its inner end with an annular flange 13 which engages the bottom of the trough and holds the plug in operative position therein. The foraminous closure for the plug is designed to admit air for ventilating the trough and the feed contained therein and to provide for the thorough cleaning of the box when necessary.

Arranged over each of the boxes and suitably secured in position thereon is an oval shaped ring 14 round in cross section, the longest diameter of which is arranged longitudinally of the box as shown and said ring is supported in operative position and secured to the manger frame by suitable flat straps or radially projecting lugs or arms 15, the inner ends of which are formed integral with or secured to the ends and sides of the ring as shown. The outer ends of the straps or lugs 15 are perforated to receive suitable fastening devices whereby the same are secured to the frame of the manger as shown. This skeleton structure formed by the ring 14 and straps 15, while restricting the movement of the animal's head permits the free circulation of air through the trough, and the arms 15 being flat prevent all possibility of the ring being turned after said straps are fastened to the manger frame, said arms being of the proper length to properly position the ring over the concaved bottom 10 of the trough. The ring 14 is preferably constructed of a bent rod or other suitable material round in cross section to present a round or curved surface to the animal's head when passed through the ring and thereby avoids all danger of injury to said animal's head such as might occur with a plate having a hole cut therein. The feed box has preferably arranged along its sides upwardly extending gratings 17 which prevent one animal from interfering with another while feeding.

The passage 5 is provided with a suitable valve 16 whereby the passage of the corn to the feed box may be cut off when desired and the chute 2 which connects the bin with the passage 5 is preferably divided into three compartments for conducting different kinds of feed and each of these compartments is provided with suitable controlling and regulating valves whereby the passage of the feed therethrough is regulated. The construction and arrangement of these valves and feed controlling mechanism forms a part of my pending application hereinbefore referred to and further reference thereto will not be made in this application which is particularly intended to cover the construction and arrangement of the ring 14 for preventing the waste of the food from the feed box.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. The combination with a feed box, of an oval shaped ring for limiting the motion of the animal's head the inner edge of which is rounded, and flat arms forming an integral part of the ring and projecting radially therefrom, the outer ends of said arms being secured to the upper edge of the feed box whereby the ring is positioned out of contact with the upper edges thereof, and thus permits the free circulation of the air between the ring and sides of the box.

2. The combination with a feed box having a concaved bottom and inclined sides, of an oval shaped ring for limiting the motion of the animal's head the inner edge of which is rounded, and flat arms forming an integral part of the ring and projecting radially therefrom, the outer ends of said arms being secured to the upper edge of the feed box whereby the ring is positioned over the concaved bottom of the said feed box and out of contact with the upper edges thereof, and thus permits the free circulation of the air between the ring and sides of the box.

In testimony whereof I have hereunto set my hand in presence of two subscribing witnesses.

AUGUST R. HOFFMANN.

Witnesses:
P. A. GRISWOLD,
LORETTO M. SAGEHORN.

---

Copies of this patent may be obtained for five cents each, by addressing the "Commissioner of Patents, Washington, D. C."